United States Patent
Ma et al.

(10) Patent No.: US 11,288,190 B2
(45) Date of Patent: Mar. 29, 2022

(54) METHOD, ELECTRONIC DEVICE AND COMPUTER PROGRAM PRODUCT FOR CACHING INFORMATION USING ACTIVE AND STANDBY BUFFERS

(71) Applicant: EMC IP Holding Company LLC, Hopkinton, MA (US)

(72) Inventors: Chun Ma, Beijing (CN); Jian Gao, Beijing (CN); Hongpo Gao, Beijing (CN); Jianbin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/887,197

(22) Filed: May 29, 2020

(65) Prior Publication Data

US 2021/0133101 A1    May 6, 2021

(30) Foreign Application Priority Data

Oct. 31, 2019   (CN) .......................... 201911050305.2

(51) Int. Cl.
*G06F 3/06* (2006.01)
*G06F 12/0802* (2016.01)

(52) U.S. Cl.
CPC ........ *G06F 12/0802* (2013.01); *G06F 3/0604* (2013.01); *G06F 3/0656* (2013.01); *G06F 3/0689* (2013.01); *G06F 2212/60* (2013.01)

(58) Field of Classification Search
CPC .. G06F 12/0802; G06F 3/0604; G06F 3/0656; G06F 2212/60

USPC ........................................................ 711/118
See application file for complete search history.

(56) References Cited

U.S. PATENT DOCUMENTS

| | | | |
|---|---|---|---|
| 9,229,864 B1 | 1/2016 | Kanteti et al. | |
| 9,280,469 B1 | 3/2016 | Kuang et al. | |
| 9,690,837 B1 | 6/2017 | Davenport et al. | |
| 9,864,683 B1 | 1/2018 | Xu et al. | |
| 9,916,244 B1 | 3/2018 | Tolvanen et al. | |
| 2002/0083166 A1* | 6/2002 | Dugan ................ | H04M 3/4228 709/223 |
| 2005/0021713 A1* | 1/2005 | Dugan .................. | H04M 15/00 709/223 |
| 2006/0165223 A1* | 7/2006 | Dugan .............. | H04M 3/42136 379/15.02 |
| 2021/0132862 A1 | 5/2021 | Gong et al. | |

* cited by examiner

*Primary Examiner* — Than Nguyen
(74) *Attorney, Agent, or Firm* — BainwoodHuang (57) ABSTRACT

Techniques for providing information involve: obtaining, from a first device for updating information, a first copy of the updated information, where a second copy of the information prior to the updating is cached in a first buffer acting as an active buffer and the second copy is provided in response to receiving a first request for providing the information from a second device; caching the first copy in a second buffer acting as a standby buffer; in response to the first copy being cached in the second buffer, switching the second buffer to the active buffer and switching the first buffer to the standby buffer; and in response to receiving a second request for providing the information from the second device, providing, to the second device, the first copy cached in the active buffer. Such techniques can ensure the consistency of the provided information without a lock.

14 Claims, 5 Drawing Sheets

METHOD, ELECTRONIC DEVICE AND COMPUTER PROGRAM PRODUCT FOR CACHING INFORMATION USING ACTIVE AND STANDBY BUFFERS

CROSS-REFERENCE TO RELATED APPLICATION

This application claims priority to Chinese Patent Application No. CN201911050305.2, on file at the China National Intellectual Property Administration (CNIPA), having a filing date of Oct. 31, 2019, and having "METHOD, ELECTRONIC DEVICE AND COMPUTER PROGRAM PRODUCT FOR PROVIDING INFORMATION" as a title, the contents and teachings of which are herein incorporated by reference in their entirety.

FIELD

Embodiments of the present disclosure generally relate to the field of data storage, and more specifically, to a method, an electronic device and a computer program product for providing information.

BACKGROUND

In a storage system employing a disk array (for example, an independent redundant disk array, RAID) for data storage, a disk array management module usually needs to provide other modules (for example, upper-layer modules) in the storage system with information about the disk array, such as device information, status information, etc. This information is collectively referred to as disk array metadata. The disk array metadata is typically updated at a disk array management module. A disk array management module is usually unable to atomically update all the information in the disk array metadata, which may cause some information in the metadata to not match with each other during the updating process. As such, when other modules obtain the disk array metadata from the disk array management module, there may be inconsistencies in the information in the metadata obtained by the other modules.

SUMMARY

Embodiments of the present disclosure provide a method, an electronic device and a computer program product for providing information.

In a first aspect of the present disclosure, there is provided a method for providing information. The method includes: obtaining, from a first device for updating information, a first copy of the updated information, where a second copy of the information prior to updating is cached in a first buffer acting as an active buffer and the second copy is provided in response to receiving a first request for providing the information from a second device; caching the first copy in a second buffer acting as a standby buffer; in response to the first copy being cached in the second buffer, switching the second buffer to the active buffer and switching the first buffer to the standby buffer; and in response to receiving a second request for providing the information from the second device, providing, to the second device, the first copy cached in the active buffer.

In a second aspect of the present disclosure, there is provided an electronic device for providing information. The device includes at least one processing unit and at least one memory. The at least one memory is coupled to the at least one processing unit and stores instructions for execution by the at least one processing unit. The instructions, when executed by the at least one processing unit, cause the device to perform acts, the acts including: obtaining, from a first device for updating information, a first copy of the updated information, where a second copy of the information prior to updating is cached in a first buffer acting as an active buffer and the second copy is provided in response to receiving a first request of providing the information from a second device; caching the first copy in a second buffer acting as a standby buffer; in response to the first copy being cached in the second buffer, switching the second buffer to the active buffer and switching the first buffer to the standby buffer; and in response to receiving a second request for providing the information from the second device, providing, to the second device, the first copy cached in the active buffer.

In a third aspect of the present disclosure, there is provided a computer program product being tangibly stored on a non-transitory computer-readable medium and including machine-executable instructions which, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

In the various figures, the same or corresponding reference numerals indicate the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As described above, in a storage system employing a disk array (for example, an independent redundant disk array, RAID) for data storage, a disk array management module usually needs to provide other modules (for example, upper-layer modules) in the storage system with information about the disk array, such as device information, status information, etc. This information is collectively referred to as disk array metadata. The disk array metadata is typically updated at a disk array management module. A disk array management module is usually unable to atomically update all the information in the disk array metadata, which may cause some information in the metadata to not match with each other during the updating process. As such, when other modules obtain the disk array metadata from the disk array management module, there may be inconsistencies in the information in the metadata obtained by the other modules.

In a conventional solution, a locking method is usually adopted to ensure data consistency. For example, disk array metadata needs to be locked before a disk array management module updating the disk array metadata to ensure that other modules cannot obtain the disk array metadata during the updating of the metadata. After the disk array management module updates all the information in the disk array metadata, the lock is released, such that other modules can obtain the updated metadata. However, there are often many problems in such solutions. For example, if other modules only expect to obtain certain information in the updated metadata, they have to wait until all information in the metadata is updated by the disk array management module and the lock is released, which will reduce performance of the system in terms of the response. In addition, locking and waiting operations executed in an asynchronous system can easily lead to deadlock.

A solution for providing consistent information is proposed according to an embodiment of the present disclosure. In this solution, two buffers are provided to record a copy (also referred to as a snapshot) of consistent information to be provided. The two buffers take the role of an active buffer and a standby buffer in turn, where the copy of information cached in the active buffer is used to respond to requests for obtaining information from other modules. When the module for updating information (for example, the disk array management module described above) completes updating all information, the copy of the updated consistent information will be cached to a standby buffer. After the caching operation is completed, the standby buffer will be switched to be the active buffer and meanwhile the original active buffer will be switched to be the standby buffer. The copy of consistent information cached in the active buffer will be used to respond to requests from other modules of obtaining information. In this way, embodiments of the present disclosure are able to ensure the consistency of the provided information without a lock.

Figure 1:
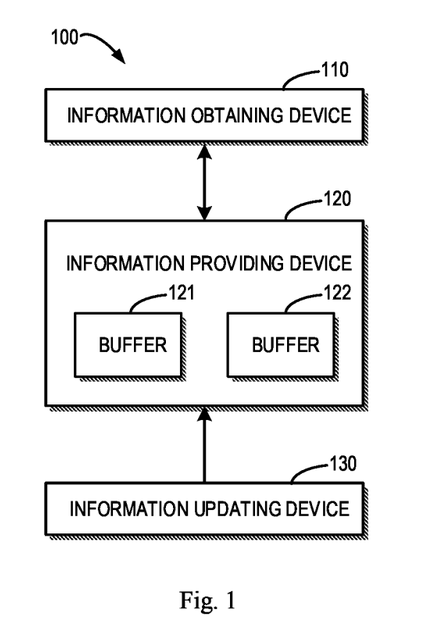
FIG. 1 illustrates a diagram of an example environment in which embodiments of the present disclosure herein can be implemented.

Hereinafter, embodiments of the present disclosure will be described in detail with reference to the accompanying drawings. FIG. 1 illustrates a diagram of an example environment 100 in which embodiments of the present disclosure herein can be implemented. It should be understood that the structure of the example environment 100 in FIG. 1 is illustrated only for the purpose of illustration, without suggesting any limitation to the scope of the present disclosure.

As shown in FIG. 1, the environment 100 may include an information obtaining device 110, an information providing device 120, and an information updating device 130. In some embodiments, the information obtaining device 110, the information providing device 120, and the information updating device 130 may be implemented on the same physical device. For example, when implemented on the same physical device, the information obtaining device 110, the information providing device 120, and the information updating device 130 may be implemented as different software or hardware modules. Alternatively, in other embodiments, the information obtaining device 110, the information providing device 120, and the information updating device 130 may be implemented on different physical devices, respectively.

The information updating device 130 (also referred to herein as "first device") may be used to update the information to be provided to the information obtaining device 110. The information providing device 120 uses two buffers 121 and 122 to record copies of information to be provided to the information obtaining device 110, thereby ensuring the consistency of the information provided to the information obtaining device 110. The information obtaining device 110 (also referred to herein as a "second device") may send a request for obtaining information to the information providing device 120 to obtain consistent information.

In some embodiments, the two buffers 121 and 122 in the information providing device 120 may take the role of an active buffer and a standby buffer in turn. The two buffers take the role of an active buffer and a standby buffer in turn, where a copy of information cached in the active buffer may be used to respond to requests for obtaining information from the information obtaining modules 110. After the information updating device 130 completes an updating of all the information, a copy of the updated consistent information will be cached to the standby buffer. After the buffering operation is completed, the standby buffer will be switched to the active buffer, and meanwhile the original active buffer will be switched to the standby buffer. The copy of the consistent information cached in the active buffer will be used to respond to a request for obtaining information from the information obtaining device 110. For example, when the information obtaining device 110 sends a request for obtaining information to the information providing device 120, the information providing device 120 may provide the information obtaining device 110 with a copy of the consistent information cached in the active buffer. Specifically, in some embodiments, when the information obtaining device 110 and the information providing device 120 are implemented as different software modules on the same physical device, the two may share a memory address space. In this case, the information providing device 120 may return only a memory address of the active buffer to the information obtaining device 110 without returning a copy of the information cached in the active buffer, thereby saving the time for the information obtaining device 110 to obtain information.

FIGS. 2A-2E illustrate diagrams of a processes of providing consistent information according to some embodiments of the present disclosure. FIGS. 2A-2E will be described in detail below with reference to FIG. 1.

Figure 2A:
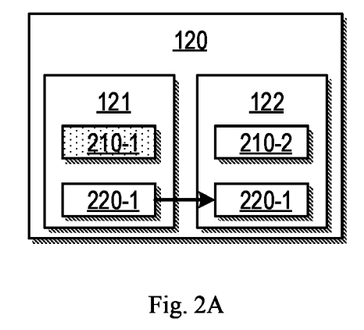
FIGS. 2A-2E illustrate diagrams of processes of providing consistent information according to some embodiments of the present disclosure.

As shown in FIG. 2A, in an initial case, the information providing device 120 may allocate two buffers 121 and 122. In some embodiments, the buffer 121 may include a role indicator 210-1 (also referred to as a "first indicator") to indicate whether the buffer acts as an active buffer or a standby buffer. For example, the role indicator 210-1 may be represented by one bit. When the role indicator is '1', the buffer 121 may be indicated as an active buffer; when the role indicator is '0', the buffer 121 may be indicated as a standby buffer. Additionally or alternatively, the buffer 122 may also include a role indicator 210-2 (also referred to as a "second indicator") to indicate whether the buffer acts as an active buffer or a standby buffer. For example, the role indicator 210-2 may be represented by one bit. When the role indicator is '1', the buffer 122 may be indicated as an active buffer; when the role indicator is '0', the buffer 122 may be indicated as a standby buffer. Alternatively, in other embodiments, the buffers 121 and 122 may share one role indicator (that is, one of the role indicators 210-1 and 210-2 shown in FIG. 2A may be omitted), the role indicator may be represented by a single bit, which may be located in the buffer 121 or 122. For example, when the role indicator is '1', it may indicate that the buffer 121 is an active buffer and the buffer 122 is a standby buffer; when the role indicator is '0', it may indicate that the buffer 121 is a standby buffer and the buffer 121 is an active buffer. In FIGS. 2A-2E, two role indicators 210-1 and 210-2 are shown for the purpose of illustration. It should be understood that this is for the purpose of illustration only and is not intended to limit the scope of the disclosure.

Without loss of generality, it is assumed that in the initial case, the buffer 121 (also referred to herein as the "first buffer") acts as an active buffer and the buffer 122 (also referred to herein as the "second buffer") acts as a standby buffer. For example, in FIGS. 2A-2E, a role indicator filled with a pattern is used to indicate an active buffer and an unfilled role indicator is used to indicate a standby buffer. In the initial case, a copy 220-1 of the initial consistent information (e.g., the copy may be provided by the information updating device 130 or other devices) may be first cached in the buffer 121 acting as an active buffer and used for responding to a request for obtaining information from the information obtaining device 110. In some embodiments, when the copy 220-1 of the initial consistent information is cached in the buffer 121 acting as an active buffer, the copy 220-1 of the information cached in the active buffer 121 may be synchronized to the buffer 122 acting as a standby buffer so as to keep the data in the two buffers consistent. Alternatively, the data synchronization operation may be omitted.

Figure 2B:
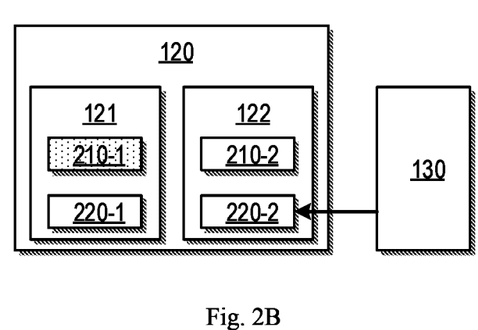

As shown in FIG. 2B, the information updating device 130 may update the information and buffer the copy 220-2 of the updated consistent information in the buffer 122 acting as the standby buffer. In some embodiments, the information updated by the information updating device 130 may include the first information and the second information which are required to match each other. For example, taking updating disk array metadata as an example, the disk array metadata may include metadata that needs to be persisted to a storage disk and metadata that does not need to be persisted to the storage disk. The two need to match each other but the update frequency and update order thereof may be different. Therefore, during the updating process, there may be cases in which the two may not match. In some embodiments, the information updating device 130 needs to provide the copy 220-2 of the updated consistent information to the information providing device 120 after completing the updating of all the information for caching in the buffer 122 acting as a standby buffer. That is, the information updating device 130 needs to ensure the consistency of the copy 220-2 of the information provided to the information providing device 120 (that is, in the copy 220-2 of the information, the first information and the second information still match each other). As shown in FIG. 2B, at this time, the buffer 121 still acts as an active buffer and the buffer 122 still acts as a standby buffer. That is, if a request for obtaining information is received from the information obtaining device 110 at this time, the information providing device 120 still provides the copy 220-1 of the consistent information cached in the buffer 121 to the information obtaining device 110.

Figure 2C:
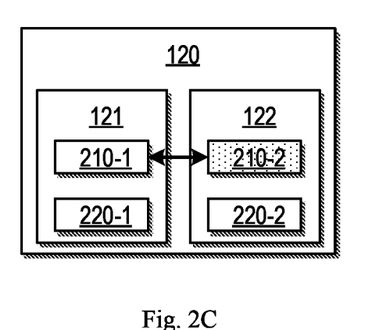

As shown in FIG. 2C, after the copy 220-2 of the information is cached into the buffer 122 acting as a standby buffer, the buffer 121 and the buffer 122 may exchange roles. That is, the buffer 121 will be switched to a standby buffer and the buffer 122 will be switched to an active buffer. In some embodiments, the buffer 121 may be switched to a standby buffer and the buffer 122 may be switched to an active buffer by modifying the role indicators 210-1 and/or 210-2. In some embodiments, when the buffer 121 and the buffer 122 share a role indicator 210-1 or 210-2, since the role indicator includes only a single bit, the roles of both the buffer 121 and the buffer 122 will be switched atomically. Alternatively, in some embodiments, when the buffer 121 and the buffer 122 have role indicators respectively, the buffer 121 and the buffer 122 may be switched by atomically modifying the role indicators 210-1 and 210-2 to ensure that the role switching of both the buffer 121 and the buffer 122 is performed atomically. When the roles of the buffer 121 and the buffer 122 are switched, the buffer 121 will act as a standby buffer and the buffer 122 will act as an active buffer. At this time, if a request for obtaining information is received from the information obtaining device 110, the information providing device 120 will provide the information obtaining device 110 with a copy 220-2 of the consistent information cached in the buffer 122.

Figure 2D:
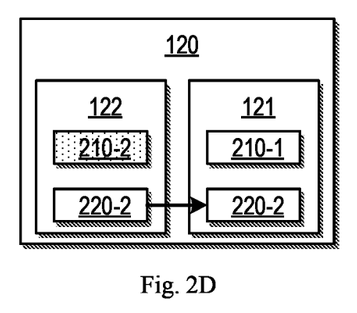

As shown in FIG. 2D, in some embodiments, after the copy 220-2 of the consistent information is cached into the buffer 122 and the buffer 122 is switched to the active buffer, the copy 220-2 of the information cached in the active buffer 122 may be synchronized into the buffer 121 acting as a standby buffer to keep the data in the two buffers consistent. Alternatively, in other embodiments, the data synchronization operation as shown in FIG. 2D may be omitted.

Figure 2E:
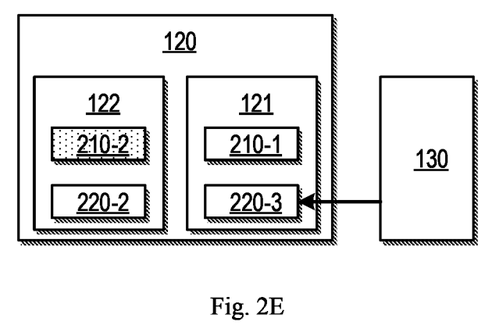

As shown in FIG. 2E, the information updating device 130 may further update the information and buffer a copy 220-3 of the updated consistent information in the buffer 121 acting as a standby buffer when the update is completed. If a request for obtaining information is received from the information obtaining device 110 at this time, since the buffer 122 still acts as an active buffer, the information providing device 120 will provide the information obtaining device 110 with the copy 220-2 of the consistent information cached in the buffer 122 acting as the active buffer.

As can be seen from the above description, the embodiments of the present disclosure can ensure the consistency of the provided information without a lock. In addition, when the information obtaining device 110, the information providing device 120, and the information updating device 130 are implemented as different software modules on the same physical device, they may share a memory address space. In this case, operations such as updating the copy of information, switching the role of buffers and providing information are all memory operations, which take a short time, so the operations will not affect the performance of the system. When the information obtaining device 110 sends a request for obtaining information to the information providing device 120, the information providing device 120 may return the memory address of the active buffer to the information obtaining device 110 without returning the copy of the information cached in the active buffer, thereby saving the time for the obtaining device 110 to obtain the information.

Figure 3:
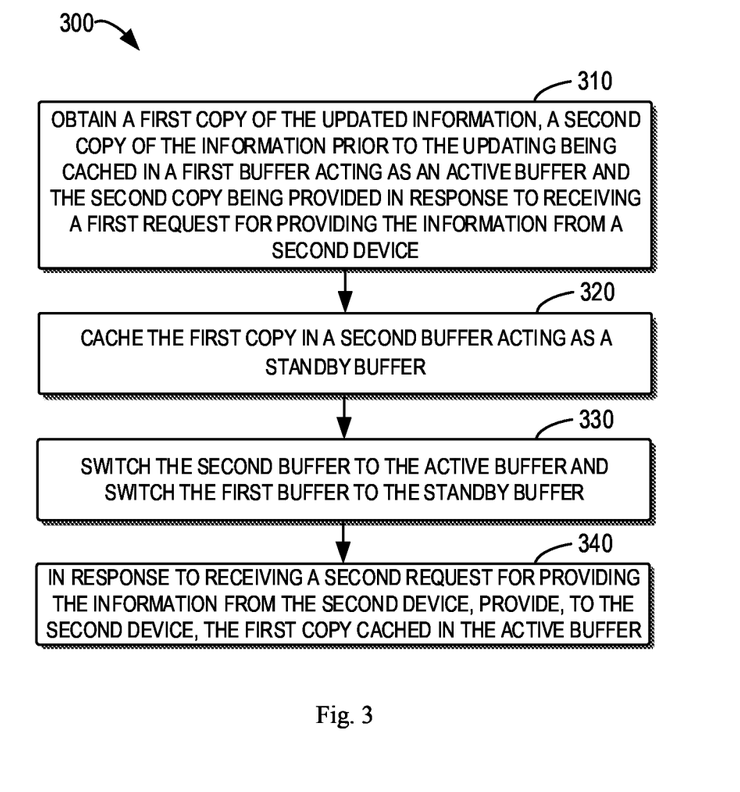
FIG. 3 illustrates a flowchart of an example method for providing information according to some embodiments of the present disclosure.

FIG. 3 illustrates a flowchart of an example method for providing information according to some embodiments of the present disclosure. For example, the method 300 may be performed by the information providing device 120 shown in FIG. 1. The method 300 is described in detail below with reference to FIG. 1. It should be understood that the method 300 may also include additional actions not shown and/or omit the actions shown. The scope of the present disclosure is not limited in this regard.

At block 310, the information providing device 120 obtains the first copy of the updated information from the first device (e.g., the information updating device 130) for updating the information, where the second copy of the information prior to updating is cached in the first buffer (e.g., the buffer 121) acting as an active buffer and the second copy is provided in response to receiving the first request for providing information from the second device (e.g., the information obtaining device 110).

In some embodiments, the information prior to updating includes the first information and the second information that match each other, and obtaining the first copy from the first device includes: in response to determining that the first information and the second information of the updated information match each other, obtaining the first copy of the updated information from the first device.

At block 320, the information providing device 120 caches the first copy in the second buffer (e.g., the buffer 122) acting as a standby buffer.

At block 330, in response to the first copy being cached in the second buffer, the information providing device 120 switches the second buffer to the active buffer and switches the first buffer to the standby buffer.

In some embodiments, the first buffer includes the first indicator indicating a role of the first buffer and the second buffer includes the second indicator indicating a role of the second buffer, and wherein switching the second buffer to the active buffer and switching the first buffer to the standby buffer includes: updating the first indicator to indicate that the first buffer acts as the standby buffer; and updating the second indicator to indicate that the second buffer acts as the active buffer. In some embodiments, the updating of the first indicator and updating of the second indicator are performed atomically.

In some embodiments, the first buffer or the second buffer includes an indicator indicating respective roles of the first buffer and the second buffer, and wherein switching the second buffer to the active buffer and switching the first buffer to the standby buffer includes: updating the indicator to indicate that the first buffer acts as the standby buffer and the second buffer acts as the active buffer. In some embodiments, the indicator includes a single bit.

At block 340, in response to receiving a second request for providing the information from the second device, the information providing device 120 provides, to the second device, the first copy cached in the active buffer.

In some embodiments, the method 300 further includes updating the second copy cached in the standby buffer based on the first copy cached in the active buffer.

Figure 4:
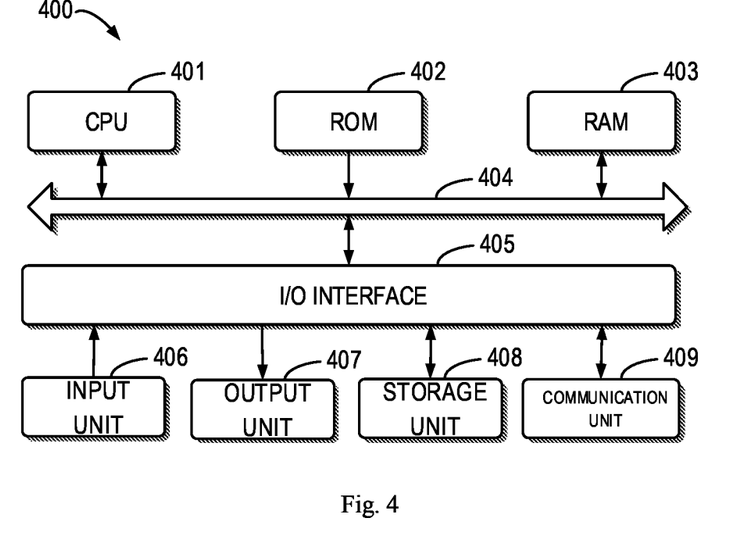
FIG. 4 illustrates a schematic block diagram of an example device for implementing embodiments of the present disclosure.

FIG. 4 illustrates a schematic block diagram of an example device 400 for implementing embodiments of the present disclosure. For example, the information obtaining device 110, the information providing device 120 and the information updating device 130 shown in FIG. 1 can be implemented by the device 400. As shown, the device 400 includes a central processing unit (CPU) 401, which may execute various suitable actions and processes based on the computer program instructions stored in a read-only memory (ROM) 402 or computer program instructions loaded in the random-access memory (RAM) 403 from a storage page 408. The RAM 403 may also store all kinds of programs and data required by the operations of the device 400. The CPU 401, ROM 402 and RAM 403 are connected to each other via a bus 404. The input/output (I/O) interface 405 is also connected to the bus 404.

A plurality of components in the device 400 is connected to the I/O interface 405, including: an input unit 406, such as a keyboard, a mouse and the like; an output unit 407, e.g., various kinds of displays and loudspeakers etc.; a storage unit 408, such as a magnetic disk and an optical disk etc.; and a communication unit 409, such as a network card, a modem, a wireless transceiver and the like. The communication unit 409 allows the device 400 to exchange information/data with other devices via the computer network, such as Internet, and/or various telecommunication networks.

The above described procedures and processing, such as the method 300, may also be executed by the processing unit 401. For example, in some embodiments, the method 300 may be implemented as a computer software program tangibly included in the machine-readable medium, e.g., the storage unit 408. In some embodiments, the computer program may be partially or fully loaded and/or mounted to the device 400 via the ROM 402 and/or communication unit 409. When the computer program is loaded to the RAM 403 and executed by the CPU 401, one or more steps of the above described method 300 may be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium may be, but is not limited to, an electrical storage device, a magnetic storage device, an optical storage device, an electromagnetic storage device, a semiconductor storage device or any appropriate combination of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, mechanical coding devices, a punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, where the programming languages consist of object-oriented programming languages, e.g., Smalltalk, C++ and so on, and conventional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer may be connected to the user computer via any type of network, including a local area network (LAN) and a wide area network (WAN), or to the external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate a device for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by a system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order depending on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method, performed by a computing apparatus, of providing information, comprising:

obtaining, from a first device for updating information, an updated first copy of the information, a second copy of the information prior to being updated being cached in both a first buffer acting as an active buffer and a second buffer acting as a standby buffer;

while the first buffer acts as the active buffer, providing the second copy prior to being updated from the first buffer to a second device in response to receiving, from the second device, a first request for providing the information;

caching the updated first copy in the second buffer acting as the standby buffer while the first buffer continues to cache the second copy of the information prior to being updated;

in response to the first copy being cached in the second buffer, switching the second buffer to act as the active buffer and the first buffer to act as the standby buffer; and while the second buffer acts as the active buffer, in response to receiving, from the second device, a second request for providing the information, providing, to the second device, the updated first copy cached in the active buffer.

2. The method of claim 1, wherein the first buffer comprises a first indicator indicating a role of the first buffer and the second buffer comprises a second indicator indicating a role of the second buffer, and wherein switching the second buffer to act as the active buffer and the first buffer to act as the standby buffer comprises:

updating the first indicator to indicate that the first buffer acts as the standby buffer; and updating the second indicator to indicate that the second buffer acts as the active buffer.

3. The method of claim 2, wherein the updating of the first indicator and the updating of the second indicator are performed atomically.

4. The method of claim 1, wherein exactly one of the first buffer and the second buffer comprises an indicator indicating respective roles of the first buffer and the second buffer, and wherein switching the second buffer to act as the active buffer and the first buffer to act as the standby buffer comprises:

updating the indicator to indicate that the first buffer acts as the standby buffer and the second buffer acts as the active buffer.

5. The method of claim 4, wherein the indicator comprises a single bit.

6. The method of claim 1, further comprising:

in response to switching the second buffer to act as the active buffer and the first buffer to act as the standby buffer, copying the updated first copy cached in the active buffer to the standby buffer.

7. The method of claim 1 wherein:

the information is disk array metadata about a disk array; and the first device includes a disk array management module configured to update disk array metadata about the disk array.

8. An electronic device, comprising:

at least one processing unit;

at least one memory coupled to the at least one processing unit and storing instructions for execution by the at least one processing unit, the instructions, when executed by the at least one processing unit, causing the device to perform acts comprising:

obtaining, from a first device for updating information, an updated first copy of the information, a second copy of the information prior to being updated being cached in both a first buffer acting as an active buffer and a second buffer acting as a standby buffer;

while the first buffer acts as the active buffer, providing the second copy prior to being updated from the first buffer to a second device in response to receiving, from the second device, a first request for providing the information;

caching the updated first copy in the second buffer acting as the standby buffer while the first buffer continues to cache the second copy of the information prior to being updated;

in response to the first copy being cached in the second buffer, switching the second buffer to act as the active buffer and the first buffer to act as the standby buffer; and while the second buffer acts as the active buffer, in response to receiving, from the second device, a second request for providing the information, providing, to the second device, the updated first copy cached in the active buffer.

9. The device of claim 8, wherein the first buffer comprises a first indicator indicating a role of the first buffer and the second buffer comprises a second indicator indicating a role of the second buffer, and wherein switching the second buffer to act as the active buffer and the first buffer to act as the standby buffer comprises:

updating the first indicator to indicate that the first buffer acts as the standby buffer; and updating the second indicator to indicate that the second buffer acts as the active buffer.

10. The device of claim 9, wherein the updating of the first indicator and the updating of the second indicator are performed atomically.

11. The device of claim 8, wherein exactly one of the first buffer and the second buffer comprises an indicator indicating respective roles of the first buffer and the second buffer, and wherein switching the second buffer to act as the active buffer and switching the first buffer to act as the standby buffer comprises:

updating the indicator to indicate that the first buffer acts as the standby buffer and the second buffer acts as the active buffer.

12. The device of claim 11, wherein the indicator comprises a single bit.

13. The device of claim 8, wherein the acts further comprise:

in response to switching the second buffer to act as the active buffer and the first buffer to act as the standby buffer, copying the updated first copy cached in the active buffer to the standby buffer.

14. A computer program product having a non-transitory computer readable medium which stores a set of instructions to provide information; the set of instructions, when carried out by computerized circuitry, causing the computerized circuitry to perform a method of:

obtaining, from a first device for updating information, an updated first copy of the information, a second copy of the information prior to being updated being cached in both a first buffer acting as an active buffer and a second buffer acting as a standby buffer;

while the first buffer acts as the active buffer, providing the second copy prior to being updated from the first buffer to a second device in response to receiving, from the second device, a first request for providing the information;

caching the updated first copy in the second buffer acting as-a the standby buffer while the first buffer continues to cache the second copy of the information prior to being updated;

in response to the first copy being cached in the second buffer, switching the second buffer to act as the active buffer and the first buffer to act as the standby buffer; and while the second buffer acts as the active buffer, in response to receiving, from the second device, a second request for providing the information, providing, to the second device, the updated first copy cached in the active buffer.

* * * * *